US 9,100,318 B1

(12) United States Patent
Osburn, III

(10) Patent No.: US 9,100,318 B1
(45) Date of Patent: Aug. 4, 2015

(54) METHOD FOR DISCOVERING ROUTERS IN A COMMUNICATION PATH OF A SUPERVISORY CONTROL AND DATA ACQUISITION SYSTEM

(71) Applicant: DJ INVENTIONS, LLC, Houston, TX (US)

(72) Inventor: Douglas C. Osburn, III, Houston, TX (US)

(73) Assignee: DJ INVENTIONS, LLC, Houston, TX (US)

( * ) Notice: Subject to any disclaimer, the term of this patent is extended or adjusted under 35 U.S.C. 154(b) by 0 days.

(21) Appl. No.: 14/497,292

(22) Filed: Sep. 25, 2014

Related U.S. Application Data

(63) Continuation-in-part of application No. 13/590,271, filed on Aug. 21, 2012, which is a continuation-in-part of application No. 13/231,853, filed on Sep. 13, 2011, which is a continuation-in-part of application No. 12/098,545, filed on Apr. 7, 2008, now Pat. No. 8,019,546, which is a continuation of application No.

(Continued)

(51) Int. Cl.
| | |
|---|---|
| H04L 12/701 | (2013.01) |
| H04L 12/727 | (2013.01) |
| H04L 12/729 | (2013.01) |
| H04L 12/753 | (2013.01) |
| H04L 12/24 | (2006.01) |
| H04L 12/721 | (2013.01) |

(52) U.S. Cl.
CPC ............... *H04L 41/12* (2013.01); *H04L 45/26* (2013.01)

(58) Field of Classification Search
CPC ..... H04L 45/025; H04L 45/02; H04L 45/026; H04L 43/0876; H04L 43/0894; H04L 43/0852; H04L 43/0858; H04L 43/0864; H04L 43/106; H04W 40/02
USPC .......................................... 702/188; 709/238
See application file for complete search history.

(56) References Cited

U.S. PATENT DOCUMENTS

| | | | |
|---|---|---|---|
| 5,638,378 A | 6/1997 | Scop et al. | |
| 5,719,771 A | 2/1998 | Buck et al. | |
| 5,745,384 A | 4/1998 | Lanzerotti et al. | |
| 5,794,009 A | 8/1998 | Coleman et al. | |
| 5,812,394 A | 9/1998 | Lewis et al. | |
| 6,032,154 A | 2/2000 | Coleman et al. | |
| 6,047,330 A * | 4/2000 | Stracke, Jr. .................. | 709/238 |
| 6,411,987 B1 | 6/2002 | Steger et al. | |
| 6,628,992 B2 | 9/2003 | Osburn, III | |
| 6,658,349 B2 | 12/2003 | Cline | |
| 6,687,573 B2 | 2/2004 | Egolf et al. | |
| 6,751,562 B1 | 6/2004 | Blackett et al. | |
| 6,950,851 B2 | 9/2005 | Osburn, III | |
| 6,961,753 B1 | 11/2005 | Osburn, III | |
| 7,073,183 B2 | 7/2006 | Hekizono | |
| 7,225,248 B1 | 5/2007 | Osburn, III | |
| 7,286,914 B2 | 10/2007 | Cerchione et al. | |

(Continued)

FOREIGN PATENT DOCUMENTS

JP          53098861          8/1978

*Primary Examiner* — Manuel L Barbee
(74) *Attorney, Agent, or Firm* — Buskop Law Group, PC; Wendy Buskop

(57) ABSTRACT

A method for controlling data acquisition using a supervisory control and data acquisition system, wherein the system can include an enterprise server. The enterprise server can include an online configurable communication server software, a configurable server interface, a configurable protocol interface, and a configurable connection interface. The method can discover at least one router in a communication path between a communication server and at least one remote device being monitored and controlled with the supervisory control and data acquisition system and calculate latencies incurred by each hop of at least one tracer packet deployed by the communication server, to determine bandwidth restrictions.

12 Claims, 12 Drawing Sheets

Related U.S. Application Data

11/345,759, filed on Feb. 2, 2006, now abandoned, said application No. 12/098,545 is a continuation-in-part of application No. 11/050,170, filed on Feb. 3, 2005, now Pat. No. 7,587,481, and a continuation-in-part of application No. 11/050,516, filed on Feb. 3, 2005, now abandoned, said application No. 11/050,170 is a continuation-in-part of application No. 09/826,578, filed on Apr. 5, 2001, now Pat. No. 6,950,851, said application No. 11/050,516 is a continuation-in-part of application No. 09/826,578, filed on Apr. 5, 2001, now Pat. No. 6,950,851.

(60) Provisional application No. 60/649,795, filed on Feb. 3, 2005.

(56) References Cited

U.S. PATENT DOCUMENTS

| | | |
|---|---|---|
| 7,587,481 B1 | 9/2009 | Osburn, III |
| 7,646,298 B1 | 1/2010 | Osburn, III et al. |
| 7,673,337 B1 | 3/2010 | Osburn, III |
| 7,673,338 B1 | 3/2010 | Osburn, III et al. |
| 7,747,710 B1 | 6/2010 | Osburn, III et al. |
| 8,019,546 B1 | 9/2011 | Osburn, III |
| 8,069,242 B2 | 11/2011 | Hadar et al. |
| 8,204,717 B2 | 6/2012 | McLaughlin et al. |
| 2004/0217900 A1 | 11/2004 | Martin et al. |
| 2004/0244265 A1 | 12/2004 | Miyata et al. |
| 2005/0138120 A1 | 6/2005 | Gundersen et al. |
| 2005/0243733 A1* | 11/2005 | Crawford et al. ............ 370/252 |

* cited by examiner

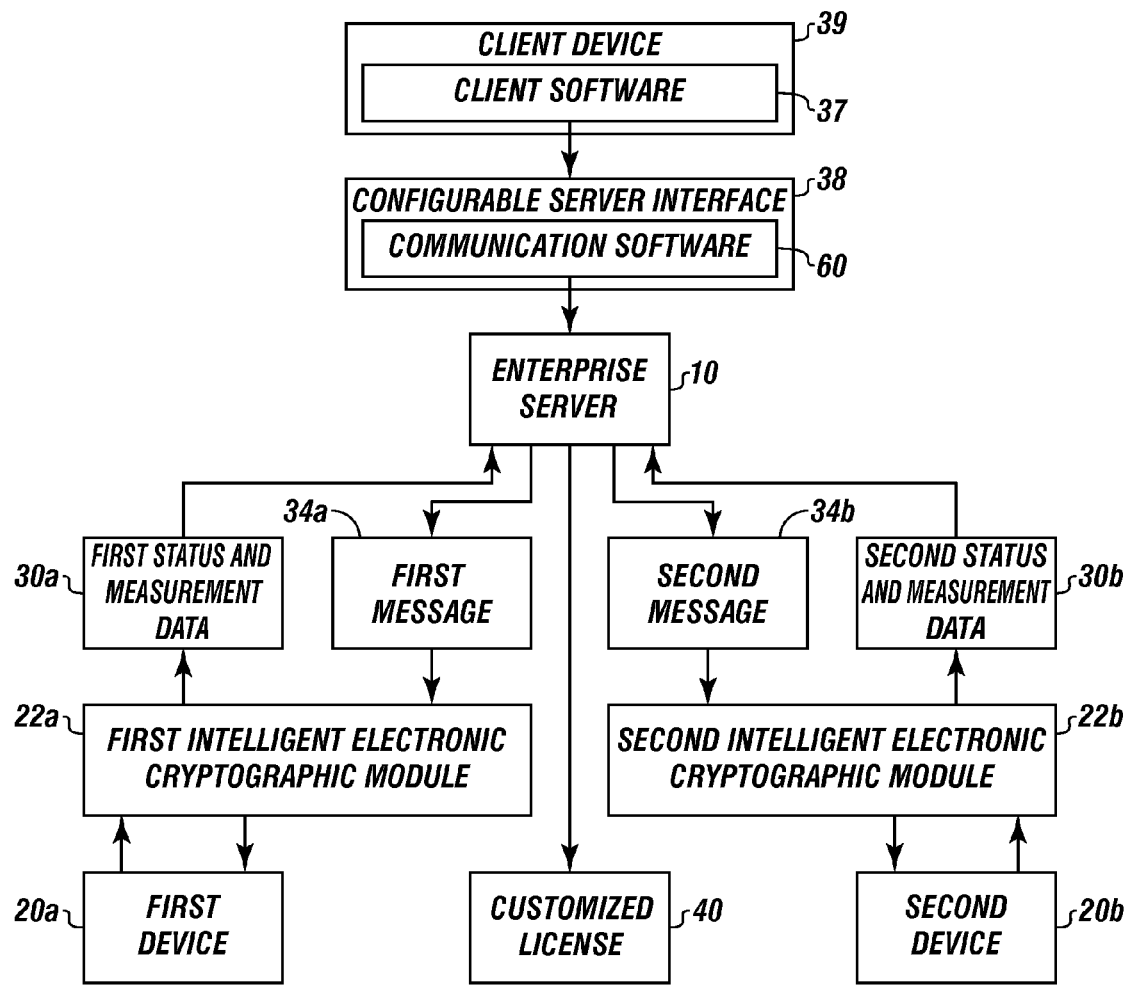

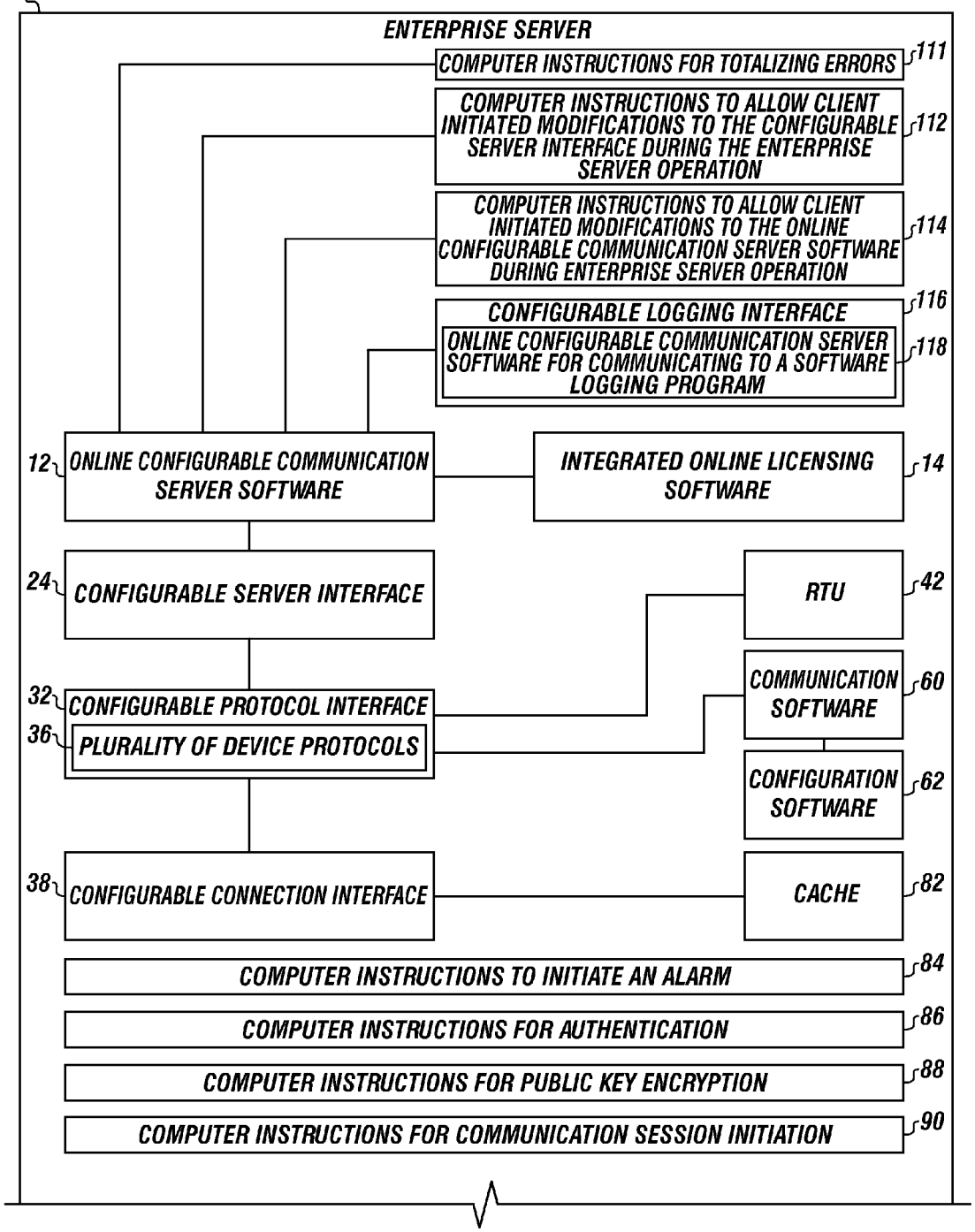

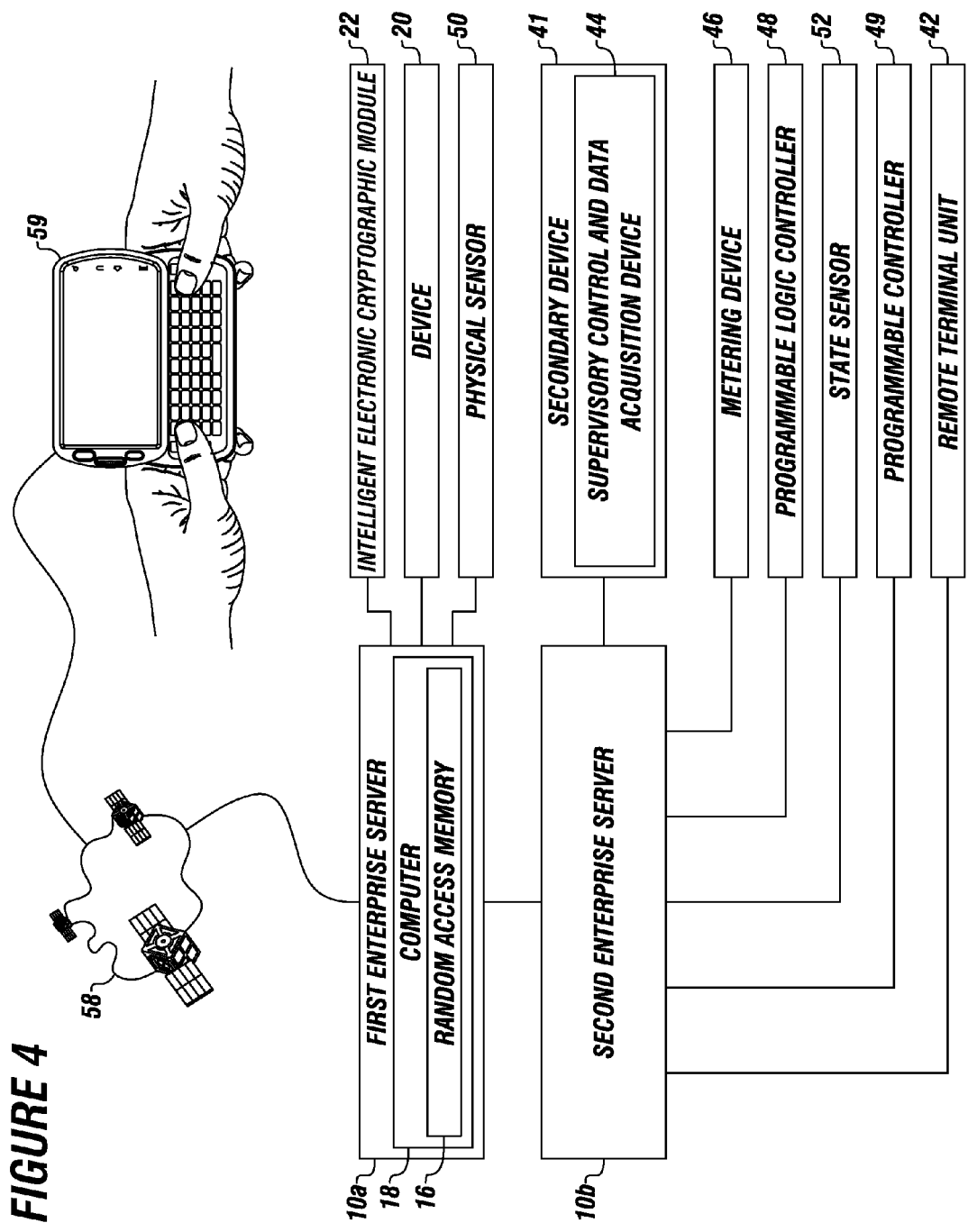

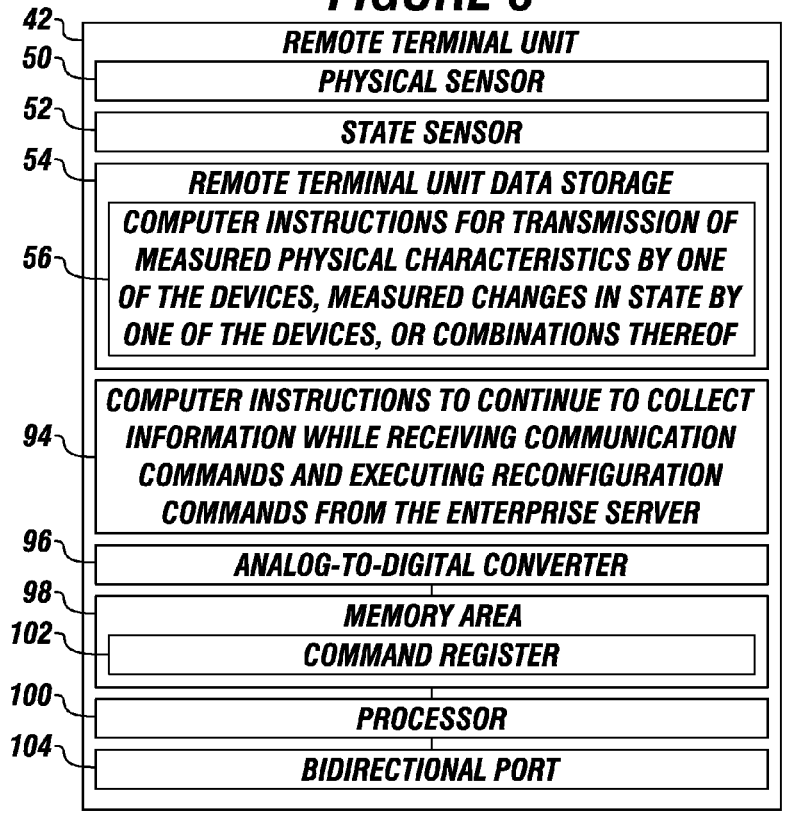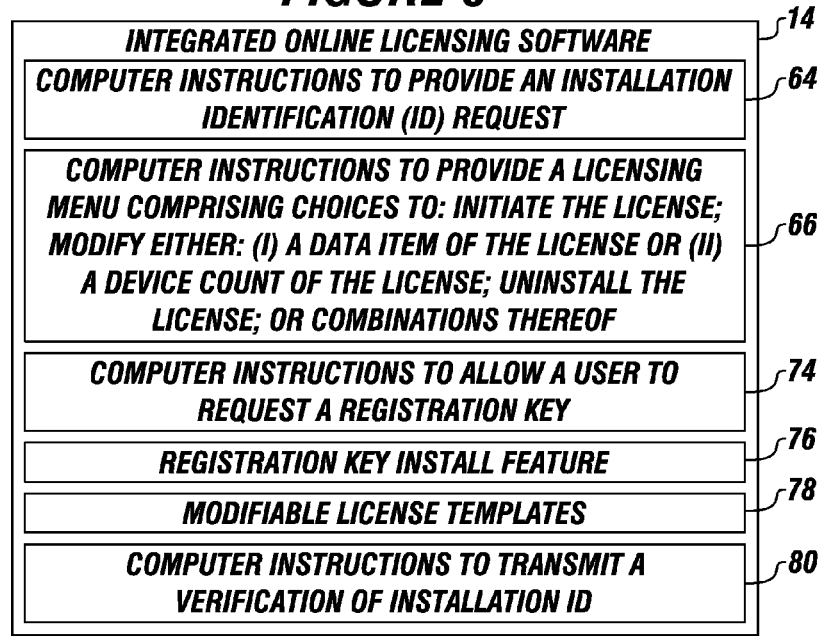

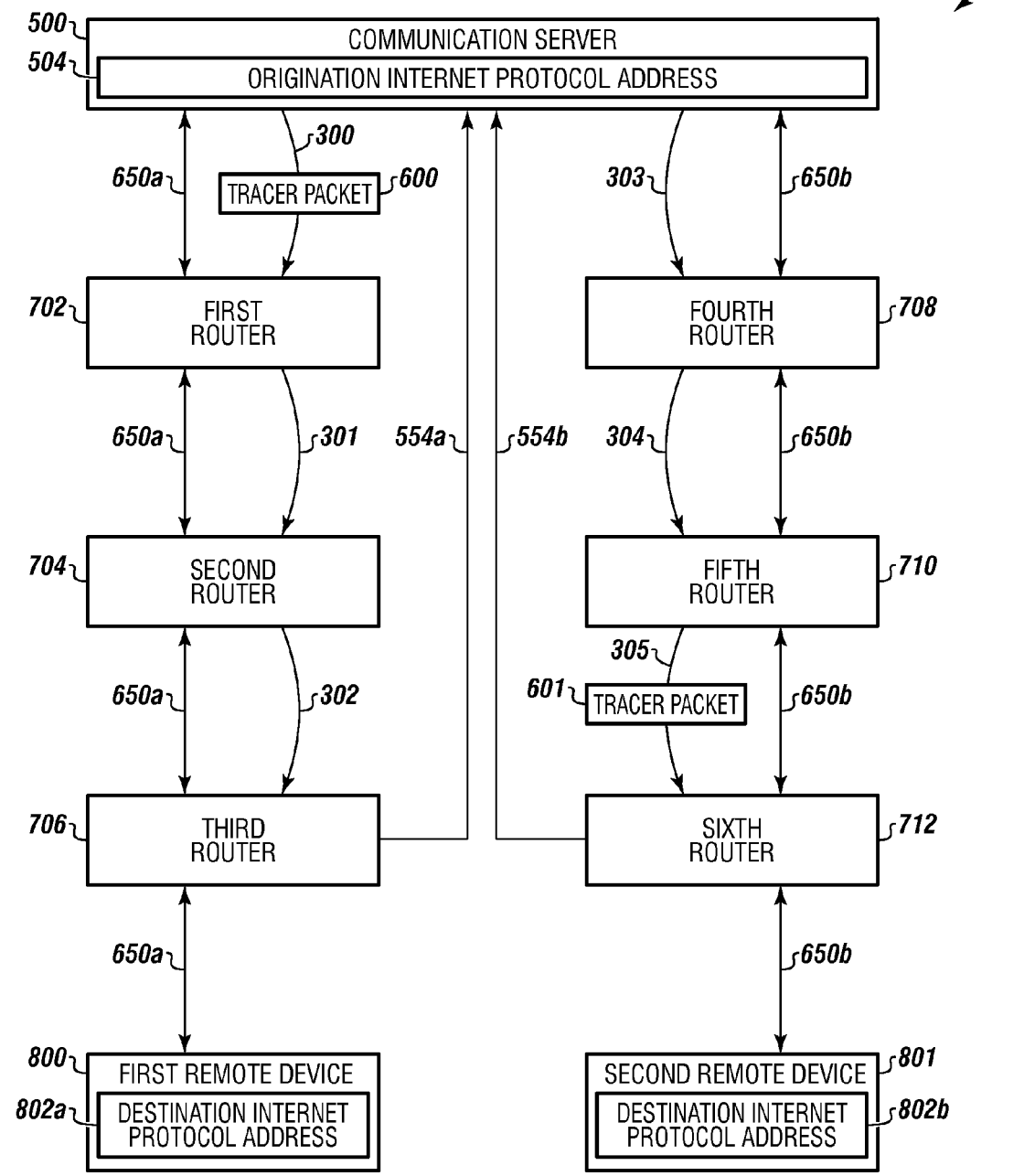

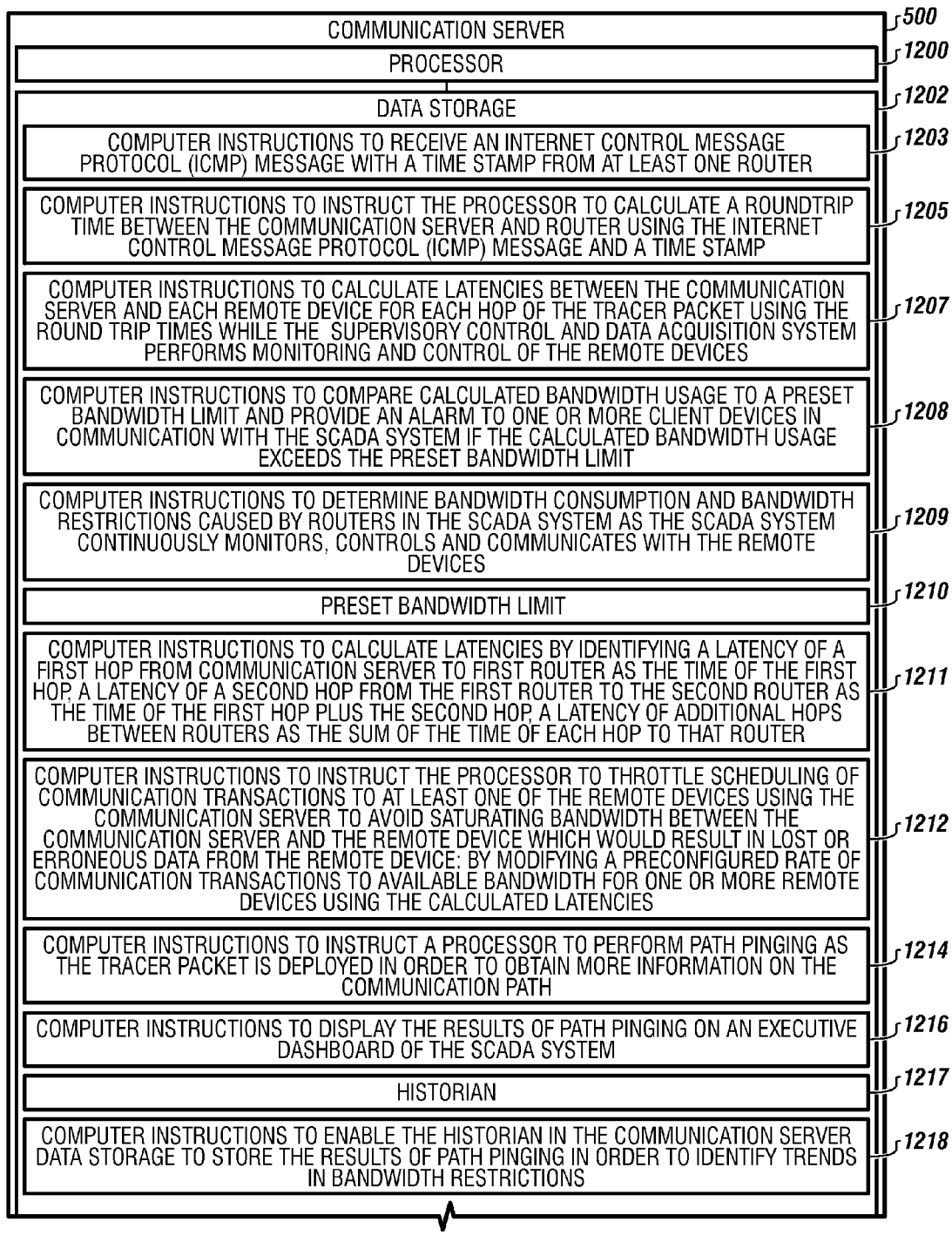

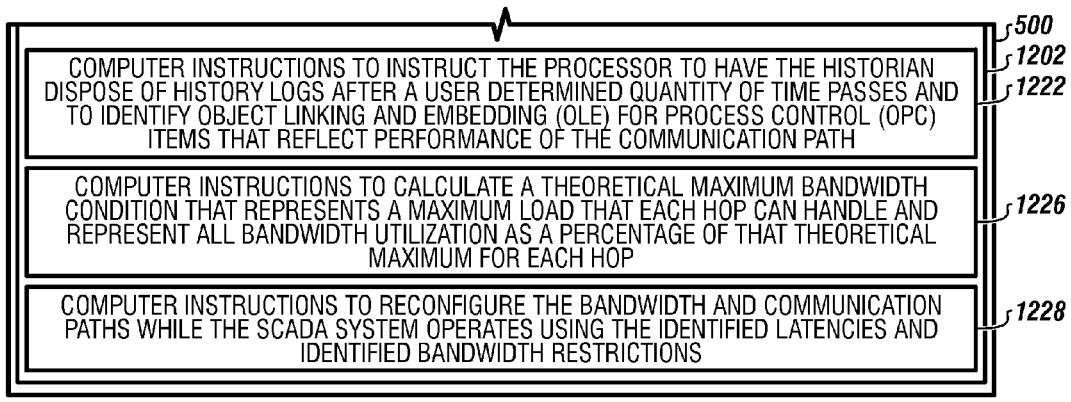
FIGURE 11B
FIGURE 12
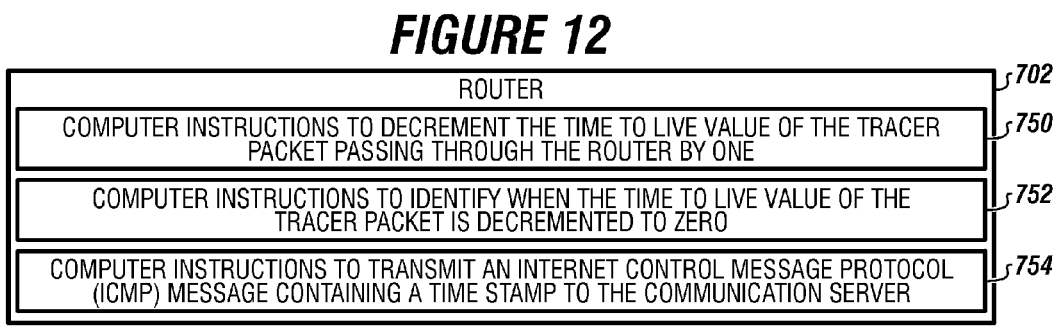

METHOD FOR DISCOVERING ROUTERS IN A COMMUNICATION PATH OF A SUPERVISORY CONTROL AND DATA ACQUISITION SYSTEM

CROSS REFERENCE TO RELATED APPLICATIONS

The present application is a Continuation in Part of co-pending U.S. patent application Ser. No. 13/590,271 filed on Aug. 21, 2012, entitled "CLOUD COMPUTING SUPERVISORY CONTROL AND DATA ACQUISITION", which is a Continuation in Part of co-pending U.S. patent application Ser. No. 13/231,853, filed on Sep. 13, 2011, which is a Continuation in Part to U.S. patent application Ser. No. 12/098,545, filed on Apr. 7, 2008, which issued as U.S. Pat. No. 8,019,546 on Sep. 13, 2011. U.S. patent application Ser. No. 12/098,545 is a Continuation of U.S. patent application Ser. No. 11/345,759, filed on Feb. 2, 2006, now abandoned, which further claims priority to Provisional Patent Application Ser. No. 60/649,795, filed on Feb. 3, 2005. U.S. patent application Ser. No. 12/098,545 is a Continuation in Part of U.S. patent application Ser. No. 11/050,170, filed on Feb. 3, 2005, which issued as U.S. Pat. No. 7,587,481 on Sep. 8, 2009 and U.S. patent application Ser. No. 11/050,516, filed on Feb. 3, 2005, now abandoned, which are each a Continuation in Part of U.S. patent application Ser. No. 09/826,578, filed on Apr. 5, 2001, which issued as U.S. Pat. No. 6,950,851 on Sep. 27, 2005. These references are incorporated herein in their entirety.

FIELD

The present embodiments generally relate to a method for cloud computing supervisory control and data acquisition system.

BACKGROUND

The automation industry has had major developments in the implementation of supervisory control and data acquisition (SCADA) monitoring and control systems.

A need exists for a cloud computing supervisory control and data acquisition system that has cryptographic modules and encrypts securely using a public key and a private key.

A vital part of any system utilized for process control, data acquisition, or alarm detection and notification, is the initial communication and periodic point-to-point communication of the system, including the process input values, the database, the displays and the like. Such a communication procedure is associated with an SCADA system, which in its most generic definition is essentially a process control system.

The components of a typical SCADA system can include an SCADA device and one or more remotely connected Intelligent Electronic Devices. As used herein, the term SCADA device can be a collection of electronic equipment, including a computer based controller, which can be a server, also termed the "enterprise server," that is used to remotely monitor communication and/or control the operation of one or more remote terminal units and remote sensing devices. In general, the enterprise server can be located miles away from the sensors collecting data or metering data, thereby presenting many SCADA system communication difficulties.

Communication for an SCADA system traditionally has been very time and labor intensive and has not involved cryptographic modules with control software that allows a control system to continue to operate while a device is added or a device is removed from the overall control system.

A need has existed for an SCADA system with cryptographic module and an ability to add and delete devices while the rest of the system continues to operate while maintaining highly accurate and detailed communication procedures and additionally allows online configuration and reconfiguration of the devices from the SCADA controller.

The present embodiments meet these needs.

BRIEF DESCRIPTION OF THE DRAWINGS

The detailed description will be better understood in conjunction with the accompanying drawings as follows:

FIG. 2 depicts a schematic of a system utilizing an enterprise server.

FIGS. 3A-3B depict a schematic of an enterprise server.

FIG. 4 depicts a system utilizing a plurality of enterprise servers.

FIG. 5 depicts a remote terminal unit with the enterprise server and software.

FIG. 6 depicts integrated online licensing software.

FIG. 7 depicts a communication server deploying two different tracer packets.

FIGS. 11A-11B depict a diagram of the communication server.

FIG. 12 shows computer instructions embodied in a router.

Figure 1:
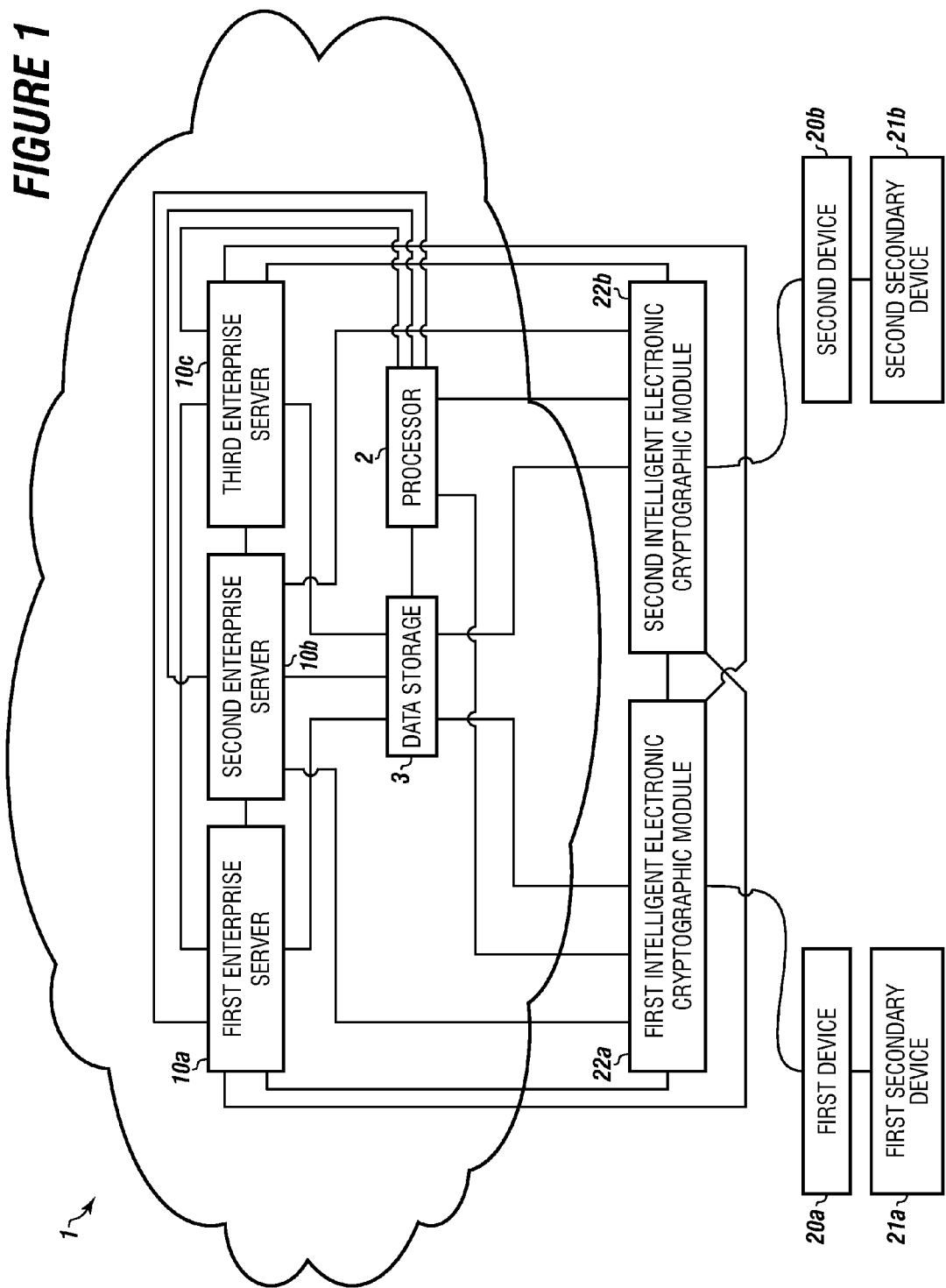
FIG. 1 depicts a schematic of a cloud computing supervisory control and data acquisition system usable with the method.

The embodiments are detailed below with reference to the listed Figures.

DETAILED DESCRIPTION OF THE EMBODIMENTS

Before explaining the method in detail, it is to be understood that the method is not limited to the particular embodiments and that they can be practiced or carried out in various ways.

The present embodiments relate to a method for cloud computing supervisory control and data acquisition.

The cloud computing system can include a computing cloud comprising one or more data storage units and one or more processing units. The computing cloud can be configured to provide at least one service on shared hardware and software resources.

The cloud computing supervisory control and data acquisition system can be in communication with a plurality of primary devices. The primary devices can be a supervisory control and data acquisition device, a metering device, a programmable logic controller, a programmable controller, a remote terminal unit, or combinations thereof.

The network usable in the SCADA system can be a satellite network, a global communication network, a cellular network, an acoustic signal, a radio frequency, a local area network, a wide area network, a private network, a public network, or combinations thereof.

The remote terminal unit can have computer instructions to continue to collect information from at least one of the primary devices while receiving communication commands and executing reconfiguration commands from the communication software.

The remote terminal unit can include an analog-to-digital converter for converting information into a digital representation of the information; a memory area for storing the digital representations; a processor in communication with the analog-to-digital converter and the memory area, wherein the processor operates upon digital representations according to a predetermined function, and wherein the processor selectively moves the digital representations to the memory area; a command register for storing communication commands, wherein the command register is in communication with the processor and the processor moves digital representations to the memory area when the command register contains an enabling communication command; and at least one bidirectional port in communication with the communication software and the enterprise server for transmitting digital representations to the enterprise server from one of the remote terminal units via the communication software, and wherein the bidirectional port receives digital representations from the communication software allowing the processor to reconfigure at least one of the remote terminal units.

A plurality of secondary devices can be in communication with the primary devices. The secondary devices can include client devices; monitoring, detection, metering, or tracking devices; bar code readers; wearable computers; other utility metering devices; other data acquisition devices; or combinations thereof.

An enterprise server can be formed from at least one processor and at least one connected data storage in the computing cloud. The enterprise server can include online configurable communication server software with integrated online licensing software.

The online configurable communication server software can be configured to initiate an alarm when a change in state occurs or when the physical characteristics of at least one of the devices exceeds or does not meet a preset value.

The enterprise server can also include computer instructions to simultaneously command, control, and online configure at least one of a plurality of devices without stopping operational functions of the enterprise server in the computing cloud.

The enterprise server can also include a configurable server interface for receiving a client request from one of the devices requesting status and measurement data on one of the devices without stopping operational functions of the enterprise server in the computing cloud.

The enterprise server can also include a configurable protocol interface in communication with the online configurable communication server software for building a message for each device using individualized device protocols for each device without stopping operational functions of the enterprise server in the computing cloud.

The enterprise server can manage communications using computer instructions for authentication of the cryptographic module by exchanging certificates, computer instructions for public key encryption to enable sharing of a cryptographic key with the cryptographic module, and computer instructions for communication session initiation and continuing communication with a symmetric key.

The enterprise server in the computing cloud can manage communications using computer instructions for coming to an agreement on a public key to secure communication between the computing cloud and the cryptographic module.

The enterprise server can include a configurable connection interface. The configurable connection interface can connect to each device, enable the message requesting status and measurement data to be transmitted to each device through each individual device protocol, receive the status and measurement data from each device to the configurable server interface using each individualized device protocol without stopping operational functions of the enterprise server in the computing cloud, and actuate integrated online licensing software to automatically create a customized license for the online configurable communication server software simultaneously while the online configurable communication server software monitors, commands, and controls the at least one device thereof without stopping operational functions of the enterprise server in the computing cloud.

The integrated online licensing software can include an installation identification request for a licensee of a licensor of the integrated online licensing software.

The integrated online licensing software can also include a licensing menu. The licensing menu can include choices to initiate the license, modify a data item of the license or a device count of the license, uninstall the license, or combinations thereof.

The integrated licensing software can also include a request for a registration key by the licensee to the licensor to set up the at least one device, a cryptographic module, or combinations thereof.

The integrated licensing software can also include a registration key install feature for the licensee for providing communication between the at least one device and the enterprise server in the computing cloud.

The integrated licensing software can also include modifiable license templates for creating the license for: a quantity of devices to be licensed, a quantity of status and measurement data to be licensed, a defined calendar period, or combinations thereof.

The integrated licensing software can also include computer instructions to transmit a verification of installation ID after the registration key is provided to the online configurable communication server software without stopping operational functions of the enterprise server in the computing cloud.

A cache of status and measurement data in can be stored in one or more data storages in the computing cloud. The cache of status and measurement data can communicate with at least one of the devices through the configurable server interface.

The enterprise server in the computing cloud can include a control system, an automatic meter reading system, another utility monitoring system, another sensor monitoring system, an alarm detection system, an alarm notification system, a data measurement system, or combinations thereof.

The online configurable communication server software can include computer instructions to request the status and the measurement data from one or more of the primary devices, one or more of the secondary devices, the cryptographic module, or combinations thereof. The status and measurement data can be requested from one or more of the primary devices, one or more of the secondary devices, the cryptographic module, or combinations thereof. The defined events can be defined times of day, a defined day, a defined time interval, or combinations thereof.

The online configurable communication server software can include computer instructions to transmit the cached status and measurement data to one of the devices, or another enterprise server.

The status and measurement data can include a member of the group consisting of:
current operational information on at least one device, operational information received from at least one device, and combinations thereof.

The operational information from one of the devices, the cryptographic module, or combinations thereof, can include a member of the group that can include: pressure data, temperature data, flow data, maintenance repair data, battery limit data, entry detection information for an enclosure, leak detection data, equipment run times, plant conditions, and combinations thereof.

The online configurable communication server software can also include computer instructions for performance monitoring which can identify and track software errors; communication errors; security parameters to track changes in registration keys, symmetric keys, public keys, or combinations thereof; errors occurring with the configurable protocol interface; errors occurring with the configurable connection interface as communication occurs with each device, cryptographic module, or combinations thereof; cryptographic module errors; or combinations thereof.

The computer instructions in the enterprise server in the computing cloud can totalize errors in communication with at least one of the devices, the cryptographic module, the enterprise server in the computing cloud, or combinations thereof.

The computer instructions in the enterprise server can provide interface control commands and allow user initiated modifications to the configurable server interface during the enterprise server operation.

The computer instructions in the enterprise server in the computing cloud as server control commands can allow users to initiate modifications to the online configurable communication server software during the enterprise server operation.

The configurable logging interface with the online configurable communication server software can communicate to a software logging program on the enterprise server in the computing cloud. The software logging program can track, view, notify, or combinations thereof, errors occurring in a communication path from the computing cloud to one of the devices, the cryptographic module, or combinations thereof, and then can store the tracked and viewed errors.

The plurality of secondary devices communicating with the primary device can be in the computing cloud.

The following terms can be used herein. The term "SCADA" can refer to supervisory control and data acquisition system. The term "ARME" can refer to the configuration or maintenance tool for the SCADA system. ARME is an OPC client that communicates through the AES, which allows various devices to be remotely reconfigured after deployment. OPC MESSENGER combines with the AES to provide a data acquisition front-end for relational databases. The term "OPC MESSENGER" refers to the AutoSol Connection, which is a data acquisition front end connection for databases. The term "GEL" means Generic Encapsulation Layer.

Turning now to the Figures, FIG. 1 depicts a schematic of a cloud computing supervisory control and data acquisition system.

The computing cloud 1 can include one or more enterprise servers, such as a first enterprise server 10a, a second enterprise server 10b, and a third enterprise server 10c. The enterprise servers 10a-10c can be in communication with one another.

A data storage 3 can also be in the computing cloud 1. The data storage 3 can be in communication with a processor 2. The data storage 3 and the processor 2 can also communicate with the enterprise servers 10a-10c.

A first device 20a can communicate with one or more of the enterprise servers 10a-10c via a first intelligent electronic cryptographic module 22a. A first secondary device 21a can be in communication with the first device 20a. The computing cloud 1 can provide one or more services to the first device 20a or the first secondary device 21a.

A second device 20b can communicate with one or more of the enterprise servers 10a-10c via a second intelligent electronic cryptographic module 22b. A second secondary device 21b can be in communication with the second device 20b. The computing cloud 1 can provide one or more services to the second device 20b or the second secondary device 21b.

The first device 20a and the second device 20b can be primary devices.

The intelligent electronic cryptographic modules 22a and 22b can function as a gateway to the computing cloud 1.

FIG. 2 shows a schematic of a system utilizing an enterprise server.

The enterprise server 10 can receive client requests from a client device 39 having client software 37 stored thereon. The enterprise server 10 can communicate with the client device 39 via configurable server interface 38, which includes communication software 60.

The enterprise server can send a first message 34a to the first device 20a via the first intelligent electronic cryptographic module 22a. The first intelligent electronic cryptographic module 22a can send first status and measurement data 30a to the enterprise server 10.

Status and measurement data can include: current operational information on at least one device, operational information received from at least one device, or combinations thereof.

The operational information from one of the devices, the cryptographic modules, or combinations thereof, can be: pressure data, temperature data, flow data, maintenance repair data, battery limit data, entry detection information for an enclosure, leak detection data, equipment run times, plant conditions, or combinations thereof.

The enterprise server 10 can also send a second message 34b to a second device 20b via the second intelligent electronic cryptographic module 22b. The second device 20b can send second status and measurement data 30b to the enterprise server 10 via the second intelligent electronic cryptographic module 22b.

The enterprise server 10 can also send out one or more customized licenses 40 to one or more end users.

Figure 3B:
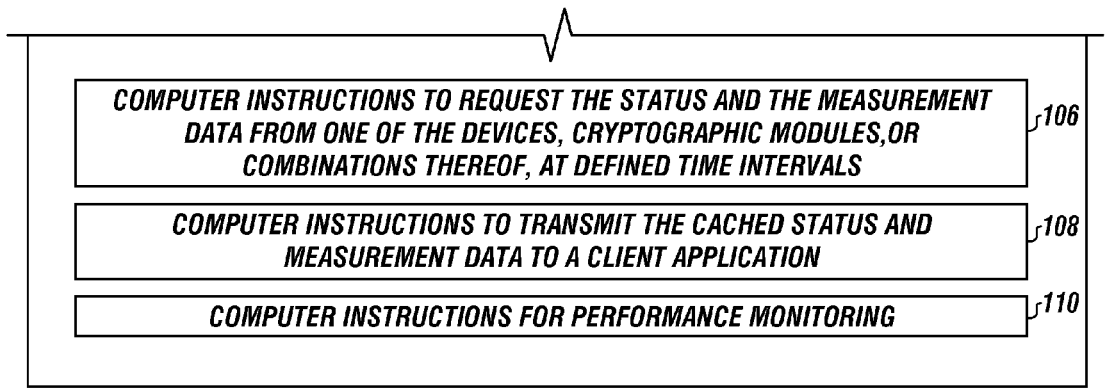

FIG. 3A shows a schematic of an enterprise server. FIG. 3B is a continuation of FIG. 3A.

Referring to FIGS. 3A and 3B, the enterprise server 10 can have a configurable server interface 24. The configurable server interface 24 can receive client requests.

A configurable protocol interface 32 can be in communication with the online configurable communication server software 12. The configurable protocol interface 32 can be used to build a message. The message can be issued using a plurality of device protocols 36. For example, one more devices in communication with the enterprise server 10 can communicate via a first device protocol and one or more devices in communication with the enterprise server can communication via a second device protocol. The configurable protocol interface can support a plurality of device protocols simultaneously.

A configurable connection interface 38 can be used to connect one or more devices, cryptographic modules, or combinations thereof to the enterprise server 10.

The enterprise server 10 can also have integrated online licensing software 14, which can automatically create customized licenses simultaneously while the enterprise server 10 operates.

The enterprise server 10 can have communication software 60 linking the enterprise server 10 with the plurality of devices, cryptographic modules, or combinations thereof. The communication software 60 can be adapted to simultaneously handle multiple types of telemetry and different device protocols associated with the devices, cryptographic modules, or combinations thereof.

The enterprise server 10 can also have configuration software 62. The configuration software 62 can be used to configure and reconfigure one or more of the devices, the cryptographic modules, the remote terminal units, or combinations thereof. The configuration software 62 can provide commands communicated using the communication software while allowing the system to continue to operate.

The enterprise server in this embodiment can contain a remote terminal unit (RTU) 42.

An embodiment of the system can involve forming a cache 82 of status and measurement data in the memory of the server. The cache 82 can be in communication with the client application through the configurable connection interface 38.

The enterprise server can include computer instructions to initiate an alarm 84. The computer instructions can be integrated with the communication software 60, the online configuration communication server software 12, or combinations thereof or otherwise associated with the enterprise server 10. The computer instructions to initiate an alarm 84 can sound an alarm when a change in state occurs or a physical condition exceeds or does not meet a preset value.

The enterprise server 10 can also include computer instructions for authentication 86. The computer instruction for authentication 86 can be used to authenticate one or more cryptographic modules by exchanging certificates.

The enterprise server 10 can also include computer instructions for public key encryption 88. The computer instructions for public key encryption 88 can enable sharing of a cryptographic key with one of the cryptographic modules.

The enterprise server 10 can have computer instructions for communication session initiation 90 and continuing communication with a symmetric key.

The enterprise server 10 can include computer instructions to request the status and the measurement data from one of the devices, cryptographic modules, or combinations thereof, at defined time intervals 106.

The enterprise server 10 can also include computer instructions to transmit the cached status and measurement data to a client application 108.

The enterprise server 10 can also include computer instructions for performance monitoring 110, which identifies and tracks a member of the group consisting of: software errors; communication errors; security parameters to track changes in registration keys, symmetric keys, public keys, or combinations thereof; errors occurring with the configurable protocol interface; errors occurring with the configurable connection interface as communication occurs with each device, cryptographic module, or combinations thereof; cryptographic module errors; and combinations thereof.

The enterprise server 10 can also have computer instructions for totalizing errors 111. The computer instructions for totalizing errors can be used to calculate or track errors in at least one device, the cryptographic module, the enterprise server, or combinations thereof.

The enterprise server 10 can also include computer instructions for allowing client initiated modifications to the configurable server interface during the enterprise server operation 112.

The enterprise server 10 can include computer instructions to allow client initiated modifications to the online configurable communication server software during enterprise server operation 114.

A configurable logging interface 116 with the online configurable communication server software for communicating to a software logging program 118 can be included on the enterprise server 10. The configurable logging interface 116 can track and display errors occurring in a channel or with each device, cryptographic module, or combinations thereof, and then storing the tracked and viewed errors.

FIG. 4 depicts a system utilizing a plurality of enterprise servers.

A first enterprise server 10a can have random access memory, such as random access memory 16 in a computer 18. The random access memory can store the computer instructions and software described herein.

The first enterprise server 10a can monitor at least one device 20, at least one intelligent electronic cryptographic module 22, or combinations thereof.

The first enterprise server 10a can be in communication with a second enterprise server 10b. The enterprise servers 10a and 10b can be in parallel or series with one another. The first enterprise server 10a can also communicate with a physical sensor 50.

The second enterprise server 10b can communicate with a metering device 46, a programmable logic controller (PLC) 48, a programmable controller 49, a remote terminal unit 42, a state sensor 52, or combinations thereof.

The enterprise servers 10a and 10b can also communicate with a secondary device 41. The enterprise servers 10a and 10b can communicate directly or indirectly with the secondary device 41. The secondary device 41 can have a second type of device within it. The second type of device can be a meter, a PLC, a supervisory control and data acquisition device, or a remote terminal unit. For example, the second type of device can be a supervisory control and data acquisition device 44.

The first enterprise server 10a can communicate with the device, the cryptographic module, the secondary device or combinations thereof while the second enterprise server 10b is added to or removed from the system.

The enterprise servers 10a and 10b can communicate via a network 58 with one or more remote devices 59.

FIG. 5 shows a remote terminal unit usable with the enterprise server and software according to one or more embodiments.

The remote terminal unit 42 can have a physical sensor 50 that measures physical characteristics; a state sensor 52 that measures changes in state of a target; a remote terminal unit data storage 54; and computer instructions for transmission of measured physical characteristics by one of the devices, measured changes in state by one of the devices, or combinations thereof 56.

The remote terminal unit 42 can have an analog-to-digital converter 96 for converting the information into digital representations of the information.

The remote terminal unit 42 can also have a memory area 98 for storing the digital representations.

A processor 100 can be in communication with the analog-to-digital converter and the memory area. The processor 100 can operate upon digital representations according to a predetermined function. The processor can selectively move the digital representations to the memory area.

The remote terminal unit can have a command register 102 in the memory area 98 for storing communication commands. The command register 102 can be in communication with the processor 100. The command register 102 can have an enabling communication command to instruct the processor to move digital representations to the memory area.

The remote terminal unit can have at least one bidirectional port 104 for transmitting and receiving data. The bidirectional port 104 can transmit digital representations to one or more enterprise servers and receive digital representations from one or more enterprise servers.

The remote terminal unit 42 can include computer instructions to continue to collect information while receiving communication commands and executing reconfiguration commands from the enterprise server 94.

The enterprise server can be contained within a control system, an automatic meter reading system, an utility monitoring system, a sensor monitoring system, an alarm detection system, an alarm notification system, a data measurement system, or combinations thereof.

FIG. 6 shows the integrated online licensing software 14 having computer instructions to provide an installation identification (ID) request 64 for a licensee of a licensor of the integrated online licensing software; and computer instructions to provide a licensing menu comprising choices to: initiate the license; modify either: (i) a data item of the license or (ii) a device count of the license; uninstall the license; or combinations thereof 66.

The integrated online licensing software 14 can also include computer instructions to allow a user to request a registration key 74.

The integrated online licensing software 14 can also include a registration key install feature 76. The registration key install feature 76 can provide a registration key to the licensee allowing communication with the enterprise server.

The integrated online licensing software 14 can contain modifiable license templates 78, which can be changed to create a license for: a quantity of devices to be licensed, a quantity of status and measurement data to be licensed, a defined calendar period, or combinations thereof.

Additionally, the integrated online licensing software 14 can include computer instructions to transmit a verification of installation ID 80. The computer instructions to transmit a verification of installation ID 80 can transmit a verification ID after the registration key is installed.

The following terms are also used herein:

The term "internet protocol network" refers to a set of cooperating processes that manipulate shared data to communicate with each other. This communication is governed by well-understood protocols, which can be embedded in the process code itself.

The term "SCADA" (supervisory control and data acquisition) refers to a system operating with coded signals over communication channels so as to provide control of remote equipment (using typically one communication path per remote station). The supervisory system can be combined with a data acquisition system by adding the use of coded signals over communication channels to acquire information about the status of the remote equipment for display or for recording functions.

The term "tracer packet" refers to a diagnostic tool for discovering the route (path) and measuring transit delays of packets across a SCADA system which continues to monitor and control at least one remote device, such as a remote terminal unit.

Internet protocol communicating systems have to communicate with each other using a shared transmission medium. Transmission is not necessarily reliable, and individual systems may use different hardware and/or operating systems. To implement a networking protocol, the protocol software modules are interfaced with a framework implemented on the machine's operating system. This framework implements the networking functionality of the operating system. The best known frameworks are the TCP/IP model and the OSI model.

With the embodied method, the history of the communication route can be recorded as the round-trip times of individual tracer packets as an individual tracer packet deployed from a communication server of a SCADA system passes successively through router on the communication path between the communication server and a remote device, such as a remote terminal unit.

With the embodied method, the sum of the mean times of each hop of the tracer packet from router to router, indicates the total time spent to establish the connection from the communication server to a remote device while discovering all the routers between the communication server of the SCADA system and the remote device, such as a remote terminal unit, a meter, a gauge or similar device.

With the embodied method, a tracer packet deployed by the communication server continues to discover routers until all routers in a communication path are identified.

In contrast, a "ping" only communication path system computes simply the final round-trip times from the communication server to a single router.

FIG. 7 depicts a communication server deploying two different tracer packets simultaneously to two different remote devices, shown as terminal units wherein the tracer packets are positioned in different hops in a network SCADA system 400.

The invention discovers dynamically and continuously, routers 702, 704 and 706 in a first communication path 650*a* of a SCADA system 400 between a communication server 500 and a first remote device 800 which has a destination internet protocol address 802*a*.

The communication server 500 is shown having an origination internet protocol address 504.

The first remote device 800 can be a remote device that is being monitored and controlled with the SCADA system simultaneously while the invention discovers the routers with the tracer packet. An example of the first remote device is a remote terminal unit attached to a pipeline to meter natural gas flowing through the pipeline.

Each step of the discovery process involves a hop by the tracer packet 600.

The first hop 300 from the communication server has the tracer packet reaching the first router 702.

A second hop 301 from the first router has the tracer packet 600 reaching a second router 704.

A third hop 302 from the second router has the tracer packet reaching a third router.

Simultaneously while the routers are being discovered, the communication server is calculating latencies incurred by each hop of a tracer packet 600 deployed by the communication server to determine bandwidth restrictions.

The invention discovers dynamically and continuously, routers 708, 710 and 712 in communication path 650*b* of the SCADA system 400 between the communication server 500 and a second remote device 801.

Simultaneously with the first communication path 650*a* is a second communication path 650*b* that bi-directionally talks to a second remote device 801 with a different destination internet protocol address 802*b* from the first remote device. The communication paths can be bidirectional.

In embodiments, the first remote device can be a meter, such as a gas flow meter, the second remote device might be a gauge, such as a water gauge.

Both remote devices can be monitored and controlled with the SCADA system 400 while the routers are being discovered.

A second tracer packet 601 is depicted discovering a fourth router 708, then a fifth router 710 and a sixth router 712.

The second tracer packet has made a first hop 303 from the communication server 500 to the fourth router 708 in the SCADA system.

The second tracer packet 601 has made a second hop 304 from the fourth router 708 to the fifth router 710 of the SCADA system.

The second tracer packet is shown making a third hop 305 from the fifth router 710 to the sixth router 712.

Both the third router and the sixth router are depicted each transmitting internet control message protocol (ICMP) messages 554a and 554b respectively to the communication server while the SCADA system continues to operate.

Each tracer packet provides information as it discovers and then travels through the routers that enable the communication server to use computer instructions 1206 (shown in FIG. 11) to determine bandwidth consumption and bandwidth restrictions for the SCADA system by router location.

Each tracer packet has an initial "time to live value" which is decremented by each router that the tracer packet travels through.

When the time to live value reaches zero, the router causing the tracer packet to reach zero transmits the internet control message protocol (ICMP) messages 554a and 554b respectively to the communication server while the SCADA system continues to operate, monitoring and controlling the remote devices simultaneously.

The invention not only enables all routers in a communication to be found, the invention additionally uses the time stamps contained in each ICMP message along with computer instructions in the communication server to calculate latencies in the communication path to determine restrictions in bandwidth of the communication path, by router, simultaneously while operating the SCADA system.

Figure 8:
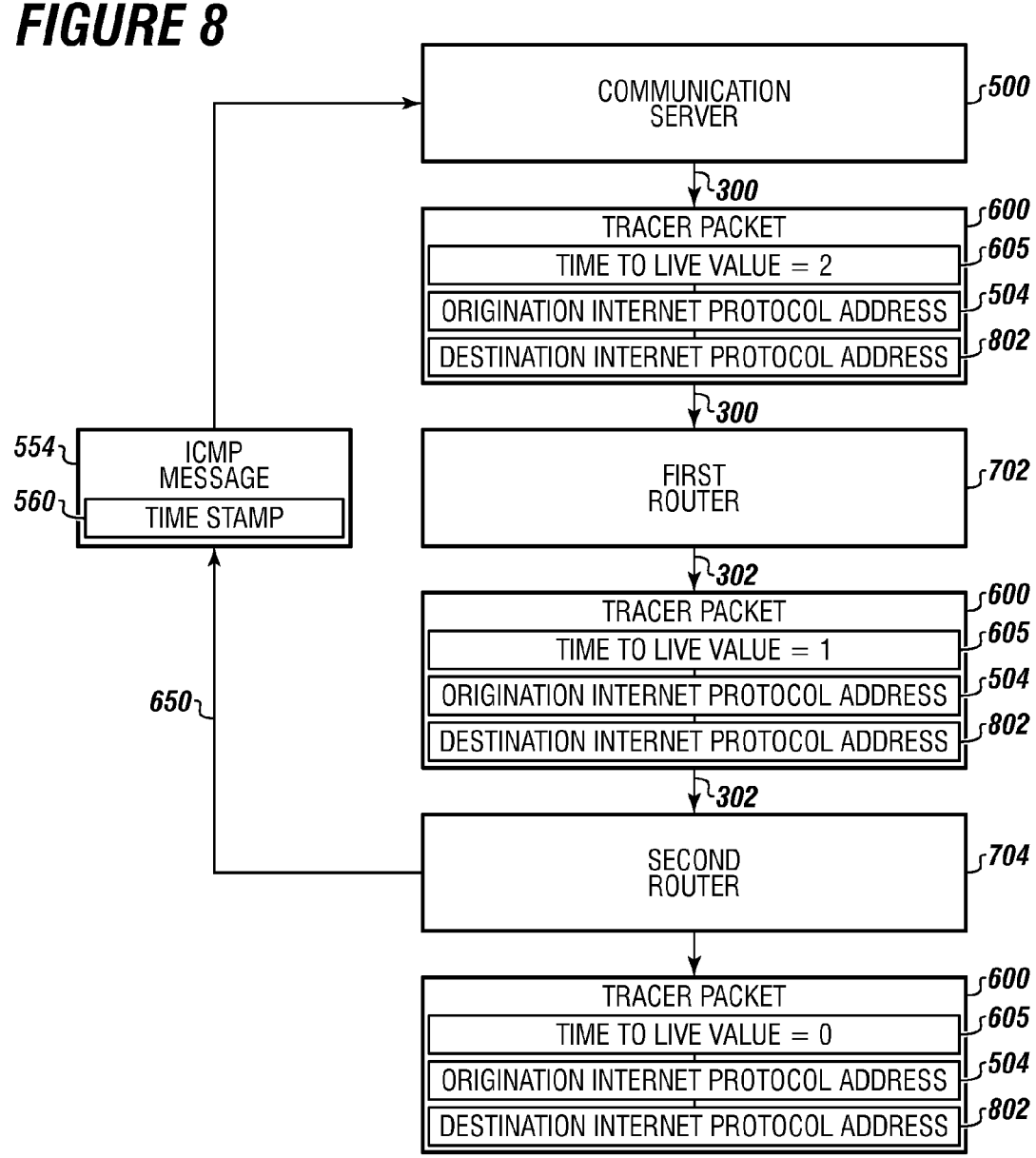
FIG. 8 shows details on movement of the tracer packets from the communication server towards a remote device.

FIG. 8 shows details on movement of the tracer packets from the communication server towards a remote device.

A tracer packet 600 includes an origination internet protocol address 504 of the communication server 500; a time to live value 605 of the tracer packet; and a destination internet protocol address 802 of the remote device.

In embodiments, each internet protocol address can be tied to a parent object.

The communication server 500 is shown deploying the tracer packet 600 through a first hop 300.

The tracer packet 600 initially has a time to live value 605 of 2.

The tracer packet then reaches the first router 702.

The first router 702 decrements the time to live value of the tracer packet 600 from 2 to 1.

After passing through the first discovered router 702, the tracer packet 600 has a time to live value 605 of 1 as well as the origination internet protocol address 504 and the destination internet protocol address 802.

The tracer packet 600 with the decremented time to live value of 1 makes a second hop 302 to discover a second router 704.

Second router 704 decrements the tracer packet time to live value from 1 to zero.

The second router identifies the tracer packet 600 with a time to live value 605 as zero and produces an ICMP message 554 which includes a time stamp 560 and transmits the ICMP message 554 on the communication path 650 to the communication server 500 while the communication server continues to operate and control remote device.

Figure 9:
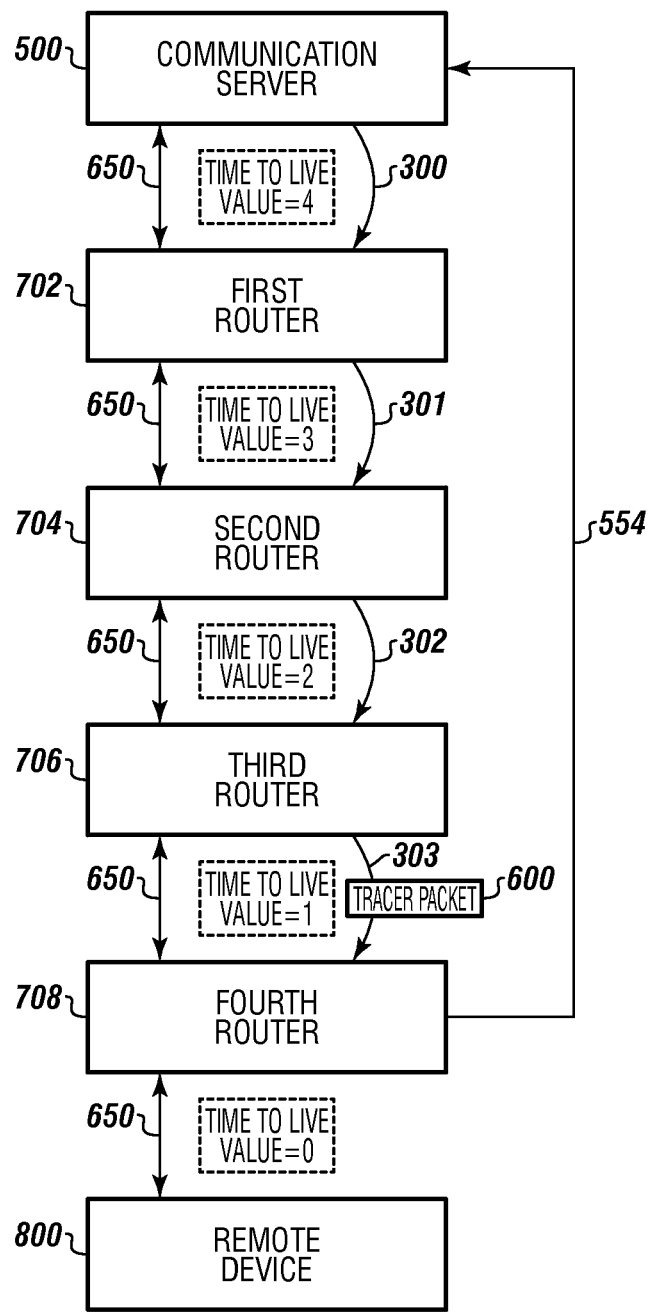
FIG. 9 shows another embodiment of the system.

FIG. 9 shows another embodiment of a system usable with the method.

The SCADA system can use a communication server 500 to deploy a tracer packet 600 while the SCADA system continues to communicate bi-directionally using the communication path 650 to a remote device 800.

In embodiments, the remote device can be remote terminal units, meters, gauges, or other actual devices that measure values, like temperature, pressure, velocity flow rate, and even chemical composition, in the case of gas chromatographs.

The communication server 500 deploys the tracer packet 600 with a time to live value of 4 using a first hop 300 to a first router 702. The first router reduces the tracer packet time to live value to 3 and the tracer packet 600 with time to live value of 3 takes a second hop 301 to discover a second router 704.

The second router 704 decrements the time to live value of the tracer packet 600 from 3 to 2 and then the tracer packet 600 performs a third hop 302 to a third router 706.

The third router 706 decrements the tracer packet 600 time to live value from 2 to 1.

The tracer packet 600 with a time to live value of 1 is shown making a fourth hop 303 to a fourth router 708.

The fourth router 708 decrements the time to live value from 1 to 0 and transmits an ICMP message 554 back to the communication server using the communication path 650.

Figure 10:
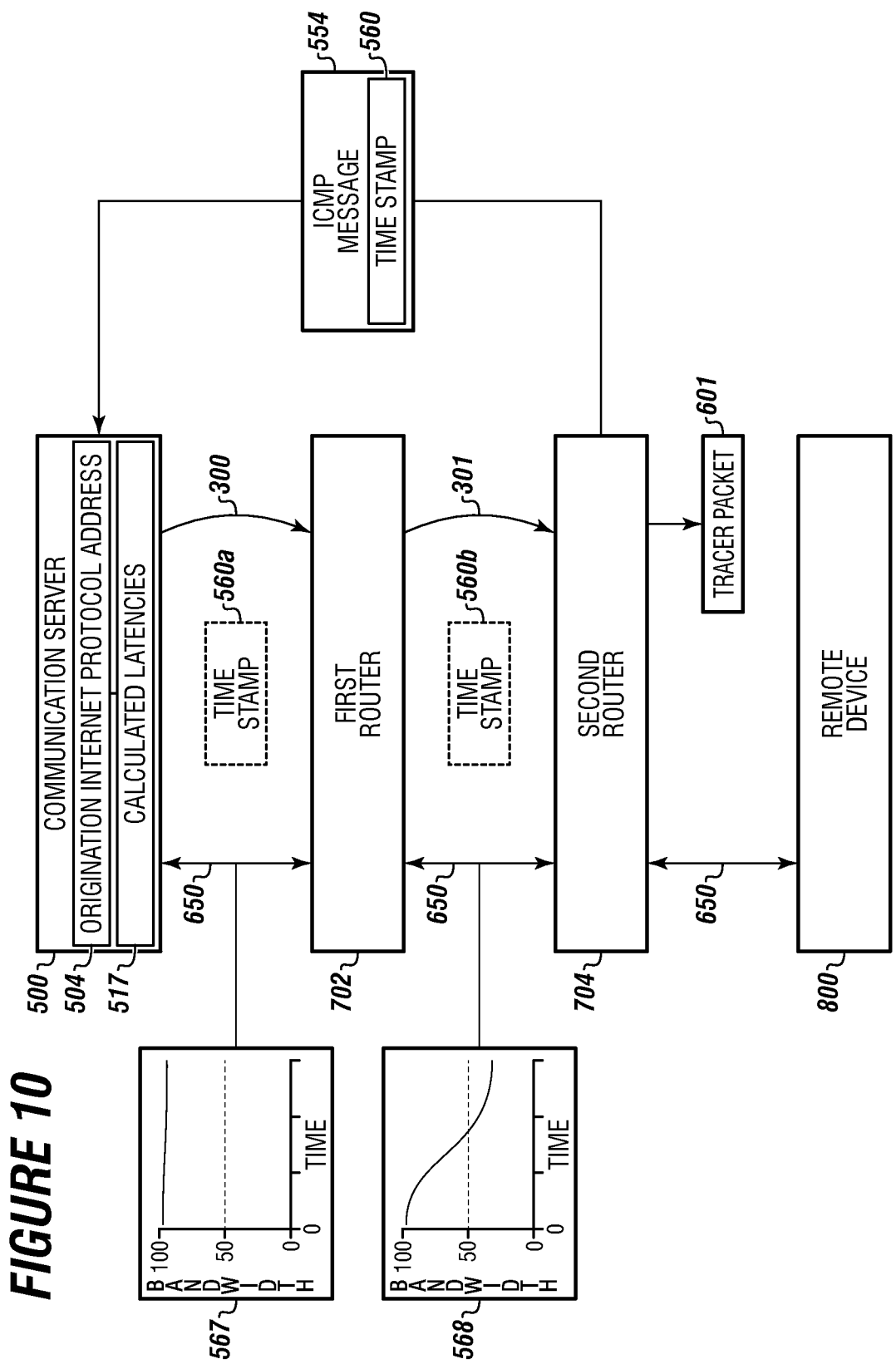
FIG. 10 is a diagram of results of use of the invention showing bandwidth restrictions produced in hops between routers.

FIG. 10 is a diagram of results of use of the invention showing bandwidth restrictions produced in hops between routers.

The communication server 500 with an origination internet protocol address 504 is shown containing calculated latencies, 517.

The communication server 500 has deployed tracer packet 601 which has performed a first hop 300 to discover a first router 702 and a second hop 301 to discover a second router 704 while the SCADA system simultaneously operates the communication path 650.

The communication path 650 can be bidirectional to a remote device 800 through first router 702 and second router 704.

The first hop 300 has an initial bandwidth 567.

The second hop 301 has a reduced bandwidth 568.

The reduced bandwidth has been identified because the communication server 500 has used the time stamps 560a and 560b and the ICMP message 554 with time stamp 560 that was produced by the second router.

In embodiments, the invention will additionally collect network diagnostics in the communication server using global and local destination internet protocol addresses, as well as by router addresses.

FIGS. 11A-11B show a diagram of the communication server 500.

The communication server can have a processor 1200 and data storage 1202.

The processor can be a microprocessor, a programmable logic circuit, a computer, or smart device, such as a smart phone, a tablet computer, or similar bidirectional communication device.

The data storage is a non-transitory computer readable medium. The computer instructions stored in the data storage can be carried out by the processor.

The data storage 1202 can include computer instructions 1203 to receive an internet control message protocol (ICMP) message with a time stamp from at least one router.

The data storage 1202 can include computer instructions 1205 to instruct the processor to calculate a roundtrip time between the communication server and router providing the ICMP message using the internet control message protocol (ICMP) message and a time stamp.

The data storage 1202 can include computer instructions 1207 to calculate latencies between the communication server and each remote device for each hop of the tracer packet using the round trip times while the supervisory control and data acquisition system performs monitoring and control of the remote devices.

The data storage 1202 can include computer instructions 1208 to compare calculated bandwidth usage to a preset bandwidth limit and provide an alarm to one or more client devices in communication with the SCADA system if the calculated bandwidth usage exceeds the preset bandwidth limit.

The data storage 1202 can include the preset bandwidth limit 1210.

The data storage 1202 can include computer instructions 1209 to determine bandwidth consumption and bandwidth restrictions caused by routers in the SCADA system as the SCADA system continuously monitors, controls and communicates with the remote devices.

Two to thousands of remote devices can be affected with this invention by a single SCADA system.

The data storage 1202 can include computer instructions 1211 to calculate latencies by identifying a latency of a first hop from communication server to first router as the time of the first hop, a latency of a second hop from the first router to a second router as the time of the first hop plus the second hop, and a latency of additional hops between routers as the sum of the time of each hop to that router.

The data storage 1202 can include computer instructions 1212 to instruct the processor to throttle scheduling of communication transactions to at least one of the remote devices using the communication server to avoid saturating bandwidth between the communication server and at least one of the remote devices which would result in lost or erroneous data from the remote device: by modifying a preconfigured rate of communication transactions to available bandwidth for one or more remote devices using the calculated latencies.

The data storage 1202 can include computer instructions 1214 to instruct a processor to perform path pinging as the tracer packet is deployed in order to obtain more information on the communication path.

The data storage 1202 can include computer instructions 1216 to display the results of path pinging on an executive dashboard of the SCADA system.

The data storage 1202 can include a historian 1217.

The data storage 1202 can include computer instructions 1218 to enable the historian in the communication server data storage to store the results of path pinging in order to identify trends in bandwidth restrictions.

The data storage 1202 can include computer instructions 1222 to instruct the processor to have the historian dispose of history logs after a user determined quantity of time passes and to identify object linking and embedding (OLE) for processes control (OPC) items that reflect performance of the communication path.

The data storage 1202 can include computer instructions 1226 to calculate a theoretical maximum bandwidth condition that represents a maximum load that each hop can handle and represent all bandwidth utilization as a percentage of that theoretical maximum for each hop.

The data storage 1202 can include computer instructions to reconfigure the bandwidth and communication paths while the SCADA system operates using the identified latencies and identified bandwidth restrictions.

FIG. 12 shows computer instructions embodied in a router according to the invention.

In embodiments, the example shown can be applicable to any router usable in the system.

The router 702 can have three computer instructions.

The router 702 can include computer instructions 750 to decrement the time to live value of the tracer packet passing through the router by one.

The router 702 can include computer instructions 752 to identify when the time to live value of the tracer packet is decremented to zero.

The router can include computer instructions 754 to transmit an internet control message protocol (ICMP) message containing a time stamp to the communication server.

In embodiments, ICMP messages can include: a source quench message; a redirect message; a destination unreachable message; a router solicitation message; a router advertisement message; a time exceeded message; a bad internet protocol (IP) header message; a parameter problem message; an information request; and an information reply.

The latencies between the communication server and each remote device can be calculated using the round trip times.

The embodied method can be used to aid in identifying network characteristic problems, such as an outage, in addition to the bandwidth problems, and also to identify other problems arising from common AP/routers.

Computer instructions can be used to instruct a processor to perform path pinging as the tracer packet is deployed in order to obtain for more information on the communication path.

Path pinging involves the processor of the communication server deploying a simple ping command along with deployment of the trace packet. Path pinging is configurable to execute commands on demand and/or to execute commands on schedule so as not to increase bandwidth consumption.

The results of path pinging can be displayed in a local diagnostics tab of an executive dashboard of the SCADA system. Computer instructions can be used to display the results of path pinging on an executive dashboard of the SCADA system, such as under a local diagnostics tab.

In another embodiment, computer instructions can be used to enable a historian in the communication server data storage to store the results of path pinging, in order to identify trends in bandwidth restrictions.

The historian can accumulate time stamped data, Boolean events, and Boolean alarms in the data storage to query or populate graphic trends.

The historian can store latency times between each hop in order to identify bottlenecking or latency issues in bandwidth between two particular network links or routers over time. The historian can store changes to the actual path of the communication path.

Computer instructions in the data storage of the communication server can instruct the processor to have the historian dispose of history logs after a user determined quantity of time passes and identifies OPC items that reflect network health in order to provide a quick-glance view of the health of a device or area.

Computer instructions in the data storage of the communication server calculate a 'theoretical maximum' bandwidth condition that represents the max load that every link of the network can handle and represents all bandwidth utilization as a percentage of that 'theoretical maximum' for each leg. Based on that percentage, a status (such as condition and color) is assigned to each 'range' of bandwidth utilization. This status, along with other conditions determined about the system, are gathered in order to generate reports, diagrams, notifications, and the like to show a concise snapshot of network "health".

With regard to the embodied methods and system, a tracer packet sends a sequence of user datagram protocol (UDP) packets addressed to a destination. ICMP Echo Request or TCP SYN packets can be used. A time to live value, also known as hop limit, is used in determining intermediate routers being traversed towards a destination. Routers decrement packets' time to live value by 1 when routing and discard packets whose time to live value has reached zero, returning the ICMP error message ICMP Time Exceeded.

Tracer packets work by sending packets with gradually increasing time to live value, starting with time to live value of 1. For example, the first router receives the packet, decrements the time to live value and drops the packet because it then has time to live value zero. The router sends an ICMP Time Exceeded message back to the source. The next set of packets are given a time to live value of 2, so the first router forwards the packets, but the second router drops them and replies with ICMP Time Exceeded.

Proceeding in this way, tracer packets use the returned ICMP Time Exceeded messages to build a list of routers that packets traverse, until the destination is reached and returns an ICMP Echo Reply message. The timestamp values returned for each router along the path are the delay (or latency) values, typically measured in milliseconds for each packet.

The sender expects a reply within a specified number of seconds. If a packet is not acknowledged within the expected interval, an asterisk is displayed.

The SCADA system does not require tracer packets to take the same route towards a particular destination, thus routers listed might be routers that other packets have traversed. If the host at hop #N does not reply, the hop is skipped in the output.

Tracer packets can rely on ICMP Time Exceeded (type 11) packets being sent to the destination. Most implementations include at least options to specify the number of queries to send per hop, time to wait for a response, the hop limit and port to use.

Selected options may include a wait for three seconds (instead of five), a send out only one query to each hop (instead of three), a limit the maximum number of hops to 16 before giving up (instead of 30).

Tracer packet errors and diagnostic messages provide information about the outbound routing path to a destination. Tracer packets provide information related to other network problems, such as the example problems listed in Table 1.

TABLE 1

| Problem example | Problem note |
| --- | --- |
| Round Trip Time | The number of milliseconds it took for a packet to be sent out, get destroyed (when its time to live value expired), and for a response packet to be generated and sent back. Each set of datagrams has its own response time; times in prior hops are irrelevant. |
| Time Exceeded | The response did not return in the allotted time. The default timeout is 2 seconds. |
| Administratively denied | An access list is blocking the response. |
| Host Not Available | The host did not respond at all. |
| Timeout | No packet received back. |
| Source Quench | Throttle back bandwidth usage. |
| Port unreachable Network Unreachable Protocol Unreachable Unknown packet type | |

If multiple hosts appear in the trace for a particular hop, it is because there is more than one path to the destination.

Tracer Packet is a command-line tool used for testing and validating routing functionality for a SCADA system.

The Tracer Packet tool can help track down routing problems and locate failures along the outbound path to a destination.

A Tracer Packet can not only discover routers while the SCADA system is still operating but simultaneously provide the user with information about the routers through which traffic passes and information about bottlenecks in bandwidth being used by router location.

With regard to the embodied methods and system, a SCADA system monitors and controls industrial processes that exist in the physical world. SCADA systems historically distinguish themselves from other ICS systems by being large-scale processes that can include multiple sites, and distributed over large areas.

SCADA industrial processes include those of manufacturing, production, power generation, fabrication, and refining, and may run in continuous, batch, repetitive, or discrete modes. SCADA infrastructure processes may be public or private, and include water treatment and distribution, wastewater collection and treatment, oil and gas pipelines, electrical power transmission and distribution, wind farms, civil defense siren systems, and large communication systems. SCADA facility processes occur both in public facilities and private ones, including buildings, airports, ships, and space stations. They monitor and control heating, ventilation, and air conditioning systems (HVAC), access, and energy consumption.

A SCADA system usually consists of multiple subsystems. One subsystem is a remote terminal unit (RTU). The remote terminal units connects to sensors in the process and convert sensor signals to digital data. The RTUs have telemetry hardware capable of sending digital data to the supervisory system, as well as receiving digital commands from the supervisory system. RTUs often have embedded control capabilities such as ladder logic in order to accomplish Boolean logic operations.

A SCADA system usually consists of meters (such as utility meter connect to sensors in the process and covert sensor signals to digital signals such as flow rates) and gauges (typically, connected to a PLC of the system providing data on pressure, and temperatures of actual remote devices)

A SCADA system usually has a programmable logic controller (PLCs) connected to sensors in the process and to convert sensor signals to digital data. PLCs have more sophisticated embedded control capabilities, typically one or more IEC 61131-3 programming languages, than RTUs. PLCs do not have telemetry hardware, although this functionality is typically installed alongside them. PLCs are sometimes used in place of RTUs as field devices because they are more economical, versatile, flexible, and configurable.

A telemetry system is typically used to connect PLCs and RTUs with control centers, data warehouses, and the enterprise. Examples of wired telemetry media used in SCADA systems include leased telephone lines and WAN circuits. Examples of wireless telemetry media used in SCADA systems include satellite (VSAT), licensed and unlicensed radio, cellular and microwave.

A SCADA system usually has a data acquisition server, which is a software service that uses industrial protocols to connect software services, via telemetry, with field devices such as RTUs and PLCs. The data acquisition server allows clients to access data from these field devices including the meters and gauges using standard protocols.

A human-machine interface or HMI is the apparatus or device which presents processed data to a human operator, and through this, the human operator monitors and interacts with the process.

A SCADA system usually has a supervisory (computer) system for gathering (acquiring) data on the process and sending commands (control) to the SCADA system. A SCADA system usually has a communication infrastructure connecting the supervisory system to the remote terminal units.

SCADA protocols are designed to be very compact to conserve bandwidth while continuing to communicate. Many SCADA systems are designed to send information only when the master station polls the RTU, the meter or the gauge.

Typical legacy SCADA protocols include Modbus RTU, RP-570, Profibus and Conitel. These communication protocols are all SCADA-vendor specific but are widely adopted and used. Standard protocols are IEC 60870-5-101 or 104, IEC 61850 and DNP3. These communication protocols are standardized and recognized by all major SCADA vendors. Many of these protocols now contain extensions to operate over TCP/IP. Although the use of conventional networking specifications, such as TCP/IP, blurs the line between traditional and industrial networking, they each fulfill fundamentally differing requirements.

With increasing security demands (such as North American Electric Reliability Corporation (NERC) and Critical Infrastructure Protection (CIP) in the US), there is increasing use of satellite-based communication. This has the key advantages that the infrastructure can be self-contained (not using circuits from the public telephone system), can have built-in encryption, and can be engineered to the availability and reliability required by the SCADA system operator. Earlier experiences using consumer-grade VSAT were poor. Modern carrier-class systems provide the quality of service required for SCADA.

RTUs and other automatic controller devices were developed before the advent of industry wide standards for interoperability. The result is that developers and their management created a multitude of control protocols. Among the larger vendors, there was also the incentive to create their own protocol to "lock in" their customer base. A list of automation protocols is compiled here.

While these embodiments have been described with emphasis on the embodiments, it should be understood that within the scope of the appended claims, the embodiments might be practiced other than as specifically described herein.

What is claimed is:

1. A method for dynamically and continuously (i) discovering routers in a communication path between a communication server and at least one remote device monitored and controlled with a supervisory control and data acquisition system, (ii) calculating latencies incurred by each hop of at least one tracer packet deployed by the communication server to determine bandwidth restrictions, the method comprising:
   a. sending the at least one tracer packet from the communication server of the supervisory control and data acquisition system to the at least one remote device in the supervisory control and data acquisition system while the supervisory control and data acquisition system monitors and controls the at least one remote device to discovering at least one router in the communication path, wherein the at least one tracer packet comprises:
      i. an origination internet protocol address of the communication server;
      ii. a time to live value of the at least one tracer packet; and
      iii. a destination internet protocol address of the at least one remote device;
   b. decrementing the time to live value of the at least one tracer packet with the at least one router as the at least one tracer packet passes through the at least one router of the communication path between the communication server and the at least one remote device until the time to live value of the at least one tracer packet reaches zero;
   c. transmitting internet control message protocol messages with a time stamp to the communication server from the at least one router which has decremented the time to live value of the at least one tracer packet to zero;
   d. calculating roundtrip times between the communication server and the at least one router transmitting the internet control message protocol messages using the time stamp; and
   e. calculating latencies between the communication server and the at least one remote device using the roundtrip times as the supervisory control and data acquisition system operates to determine bandwidth restrictions caused by the at least one router in the supervisory control and data acquisition system as the supervisory control and data acquisition system continuously monitors and controls and communicates bidirectional with the at least one remote device.

2. The method of claim 1, reconfiguring the bandwidth and the communication path while the supervisory control and data acquisition system operates using the identified latencies and identified bandwidth restrictions.

3. The method of claim 1, instructing a processor to throttle scheduling of communication transactions to the at least one remote device using the communication server to avoid saturating bandwidth between the communication server and the at least one remote device which would result in lost or erroneous data by from the at least one remote device modifying a preconfigured rate of communication transactions to available bandwidth for the at least one remote device using the calculated latencies.

4. The method of claim 1, comparing calculated bandwidth usage to a preset bandwidth limit and provide an alarm to one or more client devices in communication with the supervisory control and data acquisition system if the calculated bandwidth usage exceeds the preset bandwidth limit.

5. The method of claim 1, wherein the internet control message protocol messages, contains at least one of:
   a. a source quench message;
   b. a redirect message;
   c. a destination unreachable message;
   d. a router solicitation message;
   e. a router advertisement message;
   f. a time exceeded message;
   g. a bad internet protocol header message;
   h. a parameter problem message;
   i. an information request; and
   j. an information reply.

6. The method of claim 1, instructing a processor to perform path pinging as the at least one tracer packet is deployed in order to obtain more information on the communication path.

7. The method of claim 6, displaying the results of path pinging on an executive dashboard of the supervisory control and data acquisition system.

8. The method of claim 7, calculating a theoretical maximum bandwidth condition that represents a max load that every link of the network can handle and represents all bandwidth utilization as a percentage of that theoretical maximum for each hop.

9. The method of claim 1, further comprising a data storage, wherein the data storage comprises a historian.

10. The method of claim 9, enabling the historian in the data storage to store the results of path pinging in order to identify trends in bandwidth restrictions.

11. The method of claim 9, instructing a processor to have the historian dispose of history logs after a user determined quantity of time passes and to identify object linking and embedding for process control items that reflect network health in order to provide a quick-glance view of the health of the at least one remote device.

12. The method of claim 1, calculating latencies by identifying a latency of the first hop from the communication server to a first router as the time of the first hop, a latency of a second hop from the first router to a second router as the time of the first hop plus the second hop, a latency of additional hops between routers as the sum of the time of each hop to that router.

* * * * *